United States Patent [19]

Dannhorn et al.

[11] Patent Number: 5,565,504
[45] Date of Patent: Oct. 15, 1996

[54] AQUEOUS REACTIVE MICROGEL DISPERSIONS, A METHOD OF PREPARING THEM AND THEIR USE

[75] Inventors: Wolfgang Dannhorn; Lutz Hoppe, both of Walsrode; Erhard Lühmann, Bomlitz; Hans-Jürgen Juhl, Fallingbostel, all of Germany

[73] Assignee: Wolff Walsrode Aktiengesellschaft, Walsrode, Germany

[21] Appl. No.: 448,215

[22] Filed: May 23, 1995

[30] Foreign Application Priority Data

May 31, 1994 [DE] Germany ............... 44 18 991.5

[51] Int. Cl.$^6$ ............... C08K 7/16; C08L 67/06
[52] U.S. Cl. ............... 523/223; 524/839; 524/845; 525/921; 525/437; 525/440; 523/502
[58] Field of Search ............... 523/223, 502, 523/220; 525/426, 440; 524/839, 845

[56] References Cited

U.S. PATENT DOCUMENTS

| 3,708,452 | 1/1973 | Tsubakimoto et al. | 523/502 |
|---|---|---|---|
| 3,822,224 | 7/1974 | Gillan et al. | 523/502 |
| 4,163,093 | 7/1979 | Hess et al. | 528/301 |
| 4,451,509 | 5/1984 | Frank et al. | 427/54.1 |
| 4,673,758 | 6/1987 | Meixner et al. | 560/90 |
| 4,798,746 | 1/1989 | Claar et al. | 525/223 |
| 4,829,123 | 5/1989 | Shigematsu et al. | 525/440 |
| 5,071,904 | 12/1991 | Martin et al. | 524/458 |
| 5,089,586 | 2/1992 | Piepho et al. | 528/75 |
| 5,102,925 | 4/1992 | Suzuki et al. | 523/500 |
| 5,189,133 | 2/1993 | Meixner et al. | 528/49 |
| 5,274,067 | 12/1993 | Kressdorf et al. | 525/440 |
| 5,334,420 | 8/1994 | Hartung et al. | 427/407.1 |

FOREIGN PATENT DOCUMENTS

| 0182147 | 5/1986 | European Pat. Off. . |
|---|---|---|
| 0356848 | 3/1990 | European Pat. Off. . |
| 0401565 | 12/1990 | European Pat. Off. . |
| 4010176 | 10/1991 | Germany . |

OTHER PUBLICATIONS

Y. Yu, et al., Die Angewandte Makromolekulare Chemie, vol. 103, No. 1630, pp. 187–202, (1982).

*Primary Examiner*—Tae Yoon
*Attorney, Agent, or Firm*—Sprung Horn Kramer & Woods

[57] ABSTRACT

The present Application relates to an aqueous, reactive microgel dispersion, wherein the microgel particles have an average particle diameter of 0.01 to 1 µm, are insoluble but are capable of swelling in the usual organic solvents, dry without additional film-forming agents to form uniform, transparent, reactive films, and have iodine numbers of 2 to 100.

3 Claims, No Drawings

AQUEOUS REACTIVE MICROGEL DISPERSIONS, A METHOD OF PREPARING THEM AND THEIR USE

This invention relates to aqueous, reactive microgel dispersions, to a method of preparing them, and to their use as a lacquer raw material.

Aqueous, reactive lacquer vehicle systems based on unsaturated polyester resins which contain allyl groups and which can be emulsified in water are described in DE-A 40 11 353, EP-A 0 182 147, DE-A 28 04 216 and DE-A 29 05 666.

After the drying process they produce highly viscous liquid films, which can be thermally hardened by a radical chain mechanism with or without radical initiators or can be hardened by high-energy radiation. The surfaces obtained are characterized by good flow properties, good wetting and a good filling capacity.

Aqueous, allyl ether-containing lacquer vehicle systems such as these have proved to be advantageous, since they can be employed by the user without costly hygiene precautions. At the same time, the final coated surfaces are practically odour-free.

However, the relatively low reactivity of allyl ether double bonds in radical chain reactions necessitates low feed rates into hardening installations, of furniture coating plants for example, which results in the use of these lacquer vehicles being severely restricted due to the relatively low productivity obtained.

Improved surface properties can be obtained by subsequent modification of the above-mentioned polyester resins (DE-A 3 935 495, DE-A 4 011 349).

These polyesters are subsequently reacted in aqueous form with organic isocyanates, which results in an increase of the viscosity. However, subsequent mechanical, i.e. solvent-free, emulsification requires the resin to have a restricted viscosity and limits the isocyanate conversions to a few percent.

Hardened coatings of such allyl ether-containing polyester urethanes are characterized by high hardness, good pore texture on wood, decreased penetration into wood and good adherence. However, their rates of hardening of 1 to 2 m/minute (high-pressure Hg vapour lamp; 80 W/cm) are too low for many commercial applications.

Higher rates of hardening are obtained by using lacquer vehicles containing reactive, olefinic double bonds, such as acryloyl or methacryloyl groups. One possible route in this respect is the use of what are termed reactive thinners; these are low molecular weight, mono- or polyfunctional unsaturated compounds which are added to an aqueous polyester emulsion, for example.

A disadvantage of lacquer systems containing reactive thinners is the irritant effect of these reactive compounds on the eyes and mucous membranes. Handling them requires appropriate, expensive precautions to be taken.

Another route to reactive aqueous, lacquer vehicle systems is the use of polyesters containing acryloyl groups, as described in DE-A 28 53 921, which are copolymerized without the addition of the above-mentioned low molecular weight reactive compounds. These polyesters are synthesized in water-insoluble organic solvents. The solvent has to be distilled off before or after conversion to an aqueous emulsion. These polyesters containing acryloyl groups are characterized by a favourable processing viscosity. However, their optical surface properties, such as pore texture and pore wetting, are poor compared with aqueous polyester vehicle systems which contain allyl ethers.

U.S. Pat. No. 4,451,509 circumvents the problem of the solvent and describes a method of preparing a mixture comprising an acrylate prepolymer and an allyl ether-containing polyester resin, which can be converted into an aqueous emulsion without the use of solvents.

DE-A 4 228 713 describes a similar method, in which a prepolymer containing methacryloyl groups is mixed with a radiation-hardenable polyester resin or polyester urethane resin and is subsequently emulsified.

A common feature of all the aqueous lacquer vehicle systems described above is that they dry to form highly viscous liquid films which are soluble in the usual organic solvents. The expression "the usual organic solvents" means alcohols, e.g. methanol, ethanol or isopropanol, ketones such as acetone or methyl ethyl ketone for example, esters such as methyl, ethyl or butyl acetate for example, and aromatic and non-aromatic hydrocarbons such as toluene, xylene or benzene for example.

An ideal aqueous lacquer vehicle system should thus exhibit the good optical properties of polyester systems which contain allyl groups and the reactivity of resin dispersions which contain acryloyl groups. Moreover, it should be handleable quite safely.

Surprisingly, a reactive, aqueous lacquer vehicle system has been found which is solvent-free, free from monomers and which does not require certification, which forms a film producing coatings which are insoluble in the above-mentioned usual organic solvents, and which can be hardened by means of thermally decomposing radical initiators and also by high-energy radiation.

The present invention relates to aqueous, reactive microgel dispersions, characterized in that the dispersed microgel particles have an average particle diameter of 0.01 to 1 μm, are insoluble but are capable of swelling in the above-mentioned usual organic solvents, and dry without additional film-forming agents, such as coalescing agents, to form uniform, transparent, reactive films. Moreover, the reactive microgels are characterized by an iodine number of 2 to 100. Reactive microgel dispersions such as these surprisingly exhibit a rate of hardening which is comparable with that of aqueous organic vehicle systems containing acryloyl groups.

In addition, the microgel dispersion according to the invention is characterized in that it is prepared by radical polymerization of an aqueous resin emulsion consisting of at least one allyl ether-containing polyester or polyester urethane which can be emulsified in water, or optionally of mixtures of both and/or of mixtures of these with other olefinically unsaturated and/or saturated compounds, wherein the ratio U $$U = \frac{\text{iodine number of the microgel according to the invention}}{\text{iodine number of the mixture of starting compounds}}$$

satisfies the condition $0<U<1$, preferably $0.4<U<0.9$.

The present invention also relates to the use of the microgel dispersion according to the invention as a lacquer raw material.

The unsaturated, allyl ether-containing polyesters and polyester urethanes used according to the invention can be dispersed or can form colloidal solutions in water without emulsifiers. Emulsifiers may be used in concentrations of 0 to 5 weight % for stabilization. The preparation of the resins is described in DE-A 3 441 154, 2 905 666, 2 804 216, 4 011 353, 3 218 200, 0 182 147, and in DE-A 4 011 349 and 3 935 495, and in EP-A 0 315 920.

As stated in the above documents, these polyesters or polyester urethanes can be emulsified or can form colloidal solutions in water, due to their alkylene oxide content and/or due to a proportion of salt groups, such as carboxylates or sulphonates for example.

The emulsions used for the prepolymerization according to the invention are preferably dispersions of the above-mentioned self-emulsifying, unsaturated polyesters or polyester urethanes or optionally mixtures of both or mixtures of these resins with other compounds, as listed in the lacquer raw material tables of Karsten (Vincentz-Verlag) (subject to the prerequisite that the mixtures produce stable aqueous emulsions).

The following groups of products are cited by way of example.

Saturated polyesters, unsaturated polyesters, isocyanate resins, polyester acrylates, polyether acrylates, polyurethane acrylates, alkyd resins, polyethers, polyacrylates, ketone resins, maleate resins, polycaprolactones, polyurethanes, epoxy resins, polyvinyl compounds, amino resins, phenol resins, silicone resins, phthalates, adipates, sebacates, phosphoric acid esters, azelaic acid esters, esters of higher fatty acids, glycolic acid esters, trimellitic acid esters, sulphonic acid esters, citric acid esters, sulphonamides, natural resin esters, esters of rosin or hydrogenated rosin, sugar derivatives such as saccharose acetobutyrate.

In addition, these mixtures may contain: emulsifiers, epoxidized softeners such as epoxidized esters of natural fatty acids, and epoxidized triglycerides such as epoxidized soya bean oil or linseed oil, polymerizable softeners and flame-retardant softeners such as trichlorobutyl phosphate, trichloroethyl phosphate or diphenyl octyl phosphate, as well as ethoxylated derivatives of the above-mentioned products, such as ethoxylated phosphoric acid esters for example, and also cellulose esters, such as cellulose nitrate, cellulose acetate or cellulose acetobutyrate, for example.

The oil-in-water emulsions according to the invention are prepared by adding the polyester or polyester urethane in portions to water or vice versa. Suitable stirring devices, dispersers or dissolvers are used during the stirring-in operation.

The process step for the production of the microgel dispersion according to the invention is effected by radical polymerization of the resin emulsion with the use of water-soluble and/or oil-soluble initiators which may be introduced or metered in portions or continuously, optionally in the presence of an accelerator, the ratio of $$\frac{\text{iodine number of the microgel according to the invention}}{\text{iodine number of the mixture of starting compounds}}$$

being <1, preferably 0.4 to 0.9.

Examples of suitable water-soluble initiators include, amongst others: potassium and ammonium persulphate, tertiary butyl hydroperoxide and hydrogen peroxide.

They may be used together with accelerators, such as iron (II) sulphate, sodium sulphite, sodium hydrogen sulphite, sodium thiosulphate or ascorbic acid.

Examples of oil-soluble initiators include alkyl or aryl peroxides, such as dibenzoyl peroxide, dilauryl peroxide or cyclohexanone peroxide, for example, or percarbonates and azo compounds.

Polymerization is effected in the temperature range from 20°–100° C., preferably 40°–60° C., under an inert gas atmosphere.

In their hardened state the lacquer vehicles according to the invention have a very good abradability and hardness. In addition, they are characterized by high transparency, resistance to chemical attack and mechanical stress, and by a reduced tendency to yellowing. In order to obtain special effects, the user has the possibility of employing fillers, pigments, colorants, thixotropic agents, glossing agents, matting agents, flow promoters, etc.

Possible methods of application for the lacquer vehicles according to the invention include: spraying, rolling, application by doctor blade, pouring, brushing and dipping.

Hardening of the coatings after film formation, i.e. after the evaporation of the water, takes place by radical polymerization, either thermally with or without the addition of polymerisation-promoting initiators, or by means of high-energy radiation, such as UV, electron beam, X-ray or gamma radiation, possibly in the presence of a photo-initiator.

Hardening by means of UV radiation in association with photo-initiators is particularly preferred. Examples of suitable photo-initiators include keto compounds, benzophenones, alkyl benzophenones, halogenomethylated benzophenones, anthrones, halogenated benzophenones, phenylglyoxylic acid esters, anthraquinone and its derivatives, benzyl ketals and hydroxyalkyl phenones, benzoin and its derivatives and mixtures of these compounds with organic phosphine oxides, such as 2,4,6-trimethyl benzoyl diphenyl phosphine oxide, for example.

One possible method of thermal hardening is effected with the use of the above-mentioned water-soluble or oil-soluble initiators with or without the addition of accelerators in the form of heavy metal salts of carboxylic acids, heavy metal chelates, or acetates, naphthenates and acetylacetonates of cobalt, manganese or vanadium. The accelerator is added in the form of an aqueous solution or emulsion.

All the following reactions were conducted under a nitrogen atmosphere. The iodine numbers of the emulsions used and of the microgel dispersions according to the invention in the following examples were determined by the Wijs method according to DIN 53241 (see Table 1).

The subject of the invention is described in more detail with reference to the following examples.

EXAMPLE 1 a) 3200 g of an unsaturated polyester urethane resin, soluble in the usual organic solvents, the preparation of which is described in DE-A 4 011 349 (process example 2), was introduced into a vessel. 40 g of 12.5% aqueous ammonia were stirred in by means of a dissolver. This was followed by the addition of 104 g sodium alkylphenol polyglycol ether sulphate (Rewopol® NOS 25; manufactured by REWO) and 56 g polyethoxynonyl phenol (Antarox® CO 630; manufactured by GAF). The mixture was finally diluted with 4600 g demineralized water.

b) The emulsion was heated to 49° C. with stirring (100 rpm), and after the addition of a solution of 5 g isoascorbic acid in 10 g demineralized water, a metered addition was made of 110 g of a 2.8% aqueous hydrogen peroxide solution over a period of 5 minutes.

After a reaction time of 90 minutes, the microgel dispersion was cooled and filtered (25 µm mesh). The solids content was 41%. A sample applied to a glass plate gave a film which was free from craters and which flowed well, and which after drying was insoluble in acetone, ethyl acetate and toluene.

c) To effect UV hardening, 5% (based on the solids) of 2-hydroxy-2-methyl-1- phenylpropan-1-one (Darocur® 1173; manufactured by Merck) was added to and mixed with the microgel dispersion obtained in b). A coating with a film thickness of 90 µm was produced on a glass plate by means of a doctor blade trough. This coating was dried and irradiated with UV light from a high-pressure Hg lamp (output: 80 W/cm; feed rate: 5 m/min/lamp). After hardening, an abradable surface was obtained which had a König pendulum hardness after 24 hours (DIN 53157) of 75 seconds (see Table 1).

EXAMPLE 2

An emulsion was prepared analogously; to Example 1 a) from 360 g of the polyester urethane used in Example 1 a), 90 g of a polyester acrylate (Laromer® LR 87 99; manufactured by BASF), 5.6 g 12.5% aqueous ammonia, 14.63 g Rewopol NOS 25 (REWO), 7.88 g Antarox CO 630 (GAF) and 433.56 g demineralized water.

800 g of this emulsion were heated to 49° C. with stirring (100 rpm), and, after the addition of 1 g sodium hydrogen sulphite in 20 g demineralized water, 2 g potassium peroxydisulphate in 50 g water were added continuously over a period of 5 minutes.

After a reaction time of 6.5 hours the mixture was cooled and filtered through a 25 μm mesh. After being coated on a glass plate, a sample of the microgel dispersion which had a solids content of 47.3% gave a film which was free from craters and which flowed well, and which was insoluble in acetone, ethyl acetate and toluene.

UV hardening was effected as described in Example 1 c). The measured values are summarized in Table 1.

EXAMPLE 3

400 g of an unsaturated, allyl ether-containing polyester resin (Bayhydrol® 850 W; manufactured by Bayer), 5 g of 12.5% ammonia solution, 13 g Rewopol NOS 25 (REWO), 7 g Antarox CO 630 (GAF) and 495 g demineralized water were emulsified as described in Example 1 a) to form an oil-in-water emulsion.

800 g of this emulsion were heated to 49° C. with stirring (100 rpm), and after the addition of 0.5 g isoascorbic acid in 10 g demineralized water, polymerisation was commenced by the addition of a solution of 1 g of 30% hydrogen peroxide in 10 g water.

After a reaction time of 100 minutes the mixture was cooled and filtered (25 μm mesh). The solids content was 41.2%. After the water had evaporated, a 90 μm film coated on a glass plate was free from craters, had flowed well, and was insoluble in acetone, ethyl acetate and toluene.

The procedure for UV hardening was as described in Example 1 c) (see Table 1 for the pendulum hardness).

EXAMPLE 4

304 g of the polyester urethane described in Example 1 and 16 g of an organic polyisocyanate (Basonat® FDS 3425; manufactured by Bayer) were mixed by means of a dissolver. 4 g of 12.5% ammonia solution were then stirred in. This was followed by the addition of an emulsifier solution, consisting of 10.4 g Rewopol NOS 25 (REWO), 5.6 g Antarox CO 630 (GAF) and 64 g demineralized water. Finally, the mixture was diluted with 396 g water in order to obtain an oil-in-water emulsion.

The emulsion was heated to 41° C. with stirring (100 rpm) and mixed with a solution of 0.5 g isoascorbic acid in 10 g water. This was followed by the continuous addition of a solution of 1 g of 30% hydrogen peroxide in 10 g water over a period of 5 minutes.

After 6.5 hours, polymerisation was terminated by cooling. The solids content was 40.1%.

After coating on a glass plate and drying, a sample of the microgel dispersion gave a film which was free from craters which had flowed well, and which was insoluble in acetone, ethyl acetate and toluene.

UV hardening was effected analogously to Example 1 c) (see Table 1 for the pendulum hardnesses).

EXAMPLE 5

800 g of the polyester urethane resin used in Example 1 a) were mixed with 0.3 g of the oil-soluble initiator tertiary butyl perbenzoate. This mixture was converted into an oil-in-water emulsion as described in Example 1 a).

After heating to 49° C. the emulsion was mixed with stirring (100 rpm) with a solution of 0.5 g isoascorbic acid in 10 g demineralized water. After 95 minutes the mixture was cooled. A microgel dispersion with a solids content of 43.2% was obtained.

After coating on a glass plate and drying, a sample of the microgel dispersion gave a film which was free from craters, which had flowed well, and which was insoluble in acetone, ethyl acetate and toluene.

Subsequent UV hardening of the films was effected as in Example 1 c) (see Table 1 for the pendulum hardnesses).

EXAMPLE 6

3200 g of the unsaturated polyester urethane described in Example 1 a) were introduced into a vessel. 7400 g demineralized water were admixed by means of a dissolver.

The emulsion was heated to 41 ° C. with stirring (100 rpm) and under vacuum, and after the addition of 5 g isoascorbic acid in 10 g demineralized water, 110 g of a 2.8% aqueous solution of hydrogen peroxide was added over a period of 1 minute.

After a reaction time of 240 minutes the microgel dispersion was cooled and filtered (25 μm mesh). The solids content was 29.9%. When applied to a glass plate, a sample gave a film which was free from craters, which flowed well, and which after drying was insoluble in acetone, ethyl acetate and toluene.

UV hardening was effected as described in Example 1 c). The measured values are summarized in Table 1.

EXAMPLE 7

224 g of the unsaturated polyester urethane described in Example 1 a) were mixed with 96 g of a middle oil, non-drying alkyd resin (Rokraplast® AE 420; manufactured by Kraemer Lackharzwerke) by means of a dissolver. 4 g of 12.5% ammonia solution were then stirred in and the mixture was diluted with 523 g demineralized water.

The emulsion was heated to 41° C. with stirring (100 rpm) and mixed with 0.5 g isoascorbic acid in 10 g water. This was followed by the continuous addition of a solution of 1 g of 30% hydrogen peroxide in 110 g water over a period of 1 minute.

After 300 minutes polymerization was terminated by cooling. The solids content was 29.2%.

After coating on a glass plate and drying, a sample of the reaction mixture gave a film which was free from craters, which flowed well, and which was insoluble in acetone, ethyl acetate and toluene.

Subsequent UV hardening of the films was effected as in Example 1 c) (see Table 1 for the pendulum hardness).

COMPARATIVE EXAMPLE 1

A sample of the unpolymerized aqueous polyester urethane emulsion prepared in a) of Example 1 dried to form a highly viscous liquid coating.

After effecting UV hardening as described in Example 1 c), a solid film was obtained which was free from craters and which had flowed well, but which was not abradable. The König pendulum hardness of the film after 24 hours was 28 seconds (Table 1).

COMPARATIVE EXAMPLE 2

A sample of the (unpolymerized) aqueous emulsion of the unsaturated, allyl ether-containing polyester resin prepared in Example 3 dried to form a highly viscous liquid coating. After UV hardening as in Example 1 c), a solid film was obtained which was free from craters and which had flowed well, but which was not abradable. The König pendulum hardness of the film after 24 hours was 29 seconds (Table 1).

COMPARATIVE EXAMPLE 3

700 g of an aqueous 50% polyester acrylate resin dispersion (Laromer PE 55 W; manufactured by BASF) were diluted with 100 g demineralized water with stirring (100 rpm), heated to 47° C. and mixed with 0.7 g isoascorbic acid in 10 g water. This was followed by running in 50 ml of a 2% aqueous solution of hydrogen peroxide over a period of 5 minutes. The organic phase of the emulsion coagulated and precipitated just a few minutes after the commencement of polymerization.

The coating was hardened under a high-pressure mercury lamp (120 W/cm) at a feed rate of 10 m/minute/lamp. The lacquer surface could be abraded immediately and could be overcoated immediately at 70 g/m². In the second hardening step the feed rate was 5 m/minute/lamp. After standing for 7 days the lacquer was resistant to chemicals. Exposure to coffee, ethanol or acetone had no effect on the lacquer surface.

APPLICATION EXAMPLE 2 (comparison)

A vehicle dispersion was formulated and applied analogously to Application Example 1, in which the unpolymerized polyester urethane emulsion prepared in Example 1 a) was used. After hardening of the film (as described in Application Example 1) at a feed rate of 10 m/minute/lamp, a lacquer surface was obtained which could not be abraded, i.e. it adhered to the abrasive paper.

A lacquer surface quality comparable with that of Application Example 1 was obtained at a feed rate of 1 m/minute.

We claim:

1. An aqueous dispersion of particles of a reactive microgel comprising a polymer of at least one allyl ether-containing polyester or polyester urethane, the particles having an average diameter of 0.01 to 1 µm, the particles being insoluble but capable of swelling in methanol, ethanol, isopropanol, acetone, methyl ethyl ketone, methyl acetate, ethyl acetate, butyl acetate, benzene, toluene or xylene, the dispersion drying without an additional film-forming agent to form a uniform, transparent and reactive film, and the microgel particles having an iodine number from 2 to 100.

TABLE 1

| Example | Solids (%) | Wijs Iodine Number (mg iodine / 100 g polymer) | U (see text) | MFT/°C. (°C.) | König pendulum hardness (sec) | | Abradability |
|---------|------------|------------------------------------------------|--------------|---------------|---------------|---------------|--------------|
| | | | | | Before UV hardening | 24 hours after UV hardening using high-pressure Hg lamp [80 W/cm, 5 cm/min/lamp] | |
| 1 | 41.0 | 52 | 0.75 | <12 | 7 | 75 | very good |
| 2 | 47.3 | 55 | 0.73 | 41 | 12 | 78 | |
| 3 | 41.2 | 50 | 0.69 | <12 | 9 | 77 | |
| 4 | 40.1 | 49 | 0.74 | <12 | 10 | 64 | |
| 5 | 43.2 | 53 | 0.77 | <12 | 8 | 80 | |
| 6 | 29.9 | 52 | 0.75 | <12 | 7 | 74 | very good |
| 7 | 29.2 | 36 | 0.74 | <12 | 10 | 73 | very good |
| Comparative Example 1 | 41.0 | 69 | — | — | — | 28 | sticks to abrasive paper |
| Comparative Example 2 | 40.1 | 72 | — | — | — | 29 | |

APPLICATION EXAMPLE 1

A vehicle dispersion was formulated from, 85 parts of the microgel dispersion prepared in Example 1 b, 1 part of matting agent (TS 100; manufactured by Degussa), 1 part of photo-initiator (Darocur® 1173; manufactured by Merck), 1 part of polyurethane thickener (Schwegopur® VP 8050; manufactured by Schwegmann) and 12 parts of water. This was applied at 75 g/m² on to a wood surface (ash) by means of a spray gun, ventilated at 30° C. for 2 minutes in a circulating air drying oven, and dried at 4 m/minute at 45° C. in a nozzle drier until it was completely free from water.

2. A method of preparing a microgel dispersion according to claim 1, prepared by radical polymerization of an aqueous resin emulsion of at least one allyl ether-containing polyester or polyester urethane emulsified in water, the ratio of $$\frac{\text{iodine number of the microgel}}{\text{iodine number of the mixture of starting compounds}}$$

ranging from 0.4 to 0.9.

3. The method according to claim 2, wherein the aqueous emulsion subjected to radical polymerization additionally contains at least one member selected from the group consisting of saturated polyesters, unsaturated polyesters, isocyanate resins, polyester acrylates, polyether acrylates, polyurethane acrylates, alkyd resins, polyethers, polyacrylates, ketone resins, maleate resins, polycaprolactones, polyurethanes, epoxy resins, polyvinyl compounds, amino resins, phenol resins, silicone resins, phthalates, adipates, sebacates, phosphoric acid esters, azelaic acid esters, esters of higher fatty acids, glycolic acid esters, trimelitic acid esters, sulphonic acid esters, citric acid esters sulphonamides, natural resin esters, esters of rosin or hydrogenated rosin, and sugar esters.

* * * * *